M. F. HARRIS

OPERATING MEANS FOR CAPS OR LIDS OF GASOLINE TANKS AND THE LIKE

Original Filed Feb. 20, 1928

Feb. 10, 1931.

Re. 17,962

INVENTOR.

Max F. Harris

BY Parsons & Bodell

ATTORNEYS.

Reissued Feb. 10, 1931

Re. 17,962

UNITED STATES PATENT OFFICE

MAX F. HARRIS, OF AUBURN, NEW YORK, ASSIGNOR, BY DIRECT AND MESNE ASSIGNMENTS, TO AUTOMATIC CAP CO. INC., OF AUBURN, NEW YORK, A CORPORATION OF NEW YORK

OPERATING MEANS FOR CAPS OR LIDS OF GASOLINE TANKS AND THE LIKE

Original No. 1,736,971, dated November 26, 1929, Serial No. 255,580, filed February 20, 1928. Application for reissue filed April 26, 1930. Serial No. 447,745.

This invention relates to caps or lids for spouts such as the spouts of gasoline tanks of automobiles, radiator caps and the like, and has for its object a particularly simple and efficient operating means therefor by which the cap can be readily opened and is automatically moved into tightly closed position and locked when the force tending to hold it open is removed.

The invention consists in the novel features and in the combinations and constructions hereinafter set forth and claimed.

In describing this invention, reference is had to the accompanying drawings in which like characters designate corresponding parts in all the views.

Figure 1:
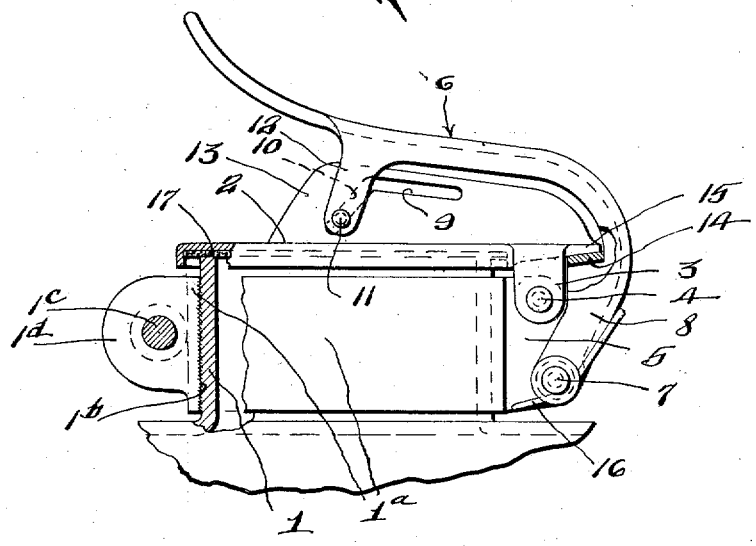
Figure 1 is an elevation partly broken away of an attachment for gasoline intake spouts embodying my invention.
Figure 2:
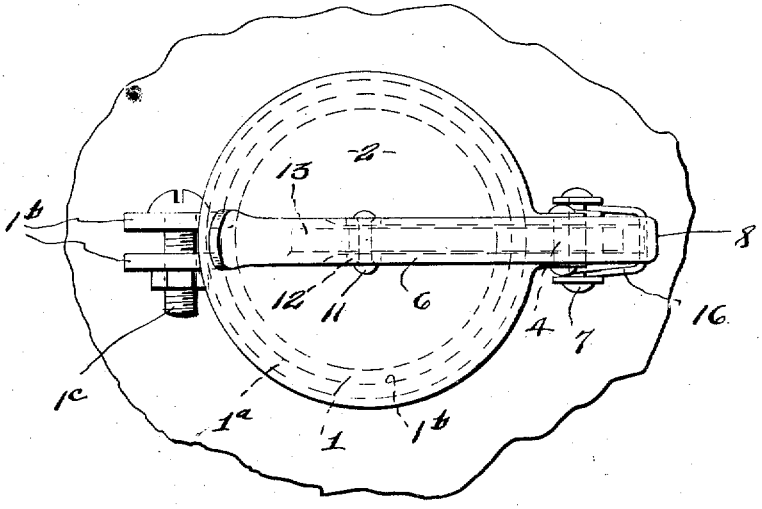
Figure 2 is a plan view of parts seen in Figure 1.

This invention comprises, generally, a tubular body and a cap or lid therefor pivoted or hinged at one side of the body and movable on its pivot into and out of position to close the body, an operating member pivotally connected to the body and connected to the cap to have a limited movement relatively thereto, and also having means for normally locking the cap closed, said means being movable into and out of coaction with the cap during the limited movement of the operating member relatively to the cap, and a spring tending to move the operating member to close the cap.

1 designates the tubular body which may be the intake spout of the gasoline tank of a motor vehicle.

$1^a$ is a body member for attaching the lids to the tubular bodies or spouts. The body $1^a$ is here illustrated as a split resilient collar capable of being clamped on the ends of spouts varying in diameter and tightly conforming to the spouts of various diameters within limits. The collar is preferably provided with means as internal fine threads $1^b$ for cutting into the outer surfaces of the spouts. The collar $1^a$ is clamped on the body or spout 1 by any suitable means as a screw bolt $1^c$ extending through ears $1^d$ on the collar. The spouts 1 are usually circular but may be of any other contour in cross section.

2 designates the cap having hinge leaves 3 pivoted at 4 to lugs or leaves 5 on the outer side of the collar $1^a$.

6 is the operating member, it being here shown as pivoted at 7 to the collar $1^a$ or the lugs 5 below the pivot 4 and slightly outwardly relatively to a vertical plane containing the pivot 4, the operating member having an upwardly extending portion 8 and a forwardly extending portion, which in this embodiment of my invention extends over the cap 2. The forward extending portion is connected to the cap to have a limited movement relatively thereto during the starting opening movement of the cap and the operating member, and during the final closing of the operating member and the cap, this limited relative movement or lost motion being for the purpose of permitting another means which closes and holds the cap closed to move out of operative position during the initial opening movement of the operating lever 6 and to move into operative position during the final closing movement of the cap.

In the illustrated embodiment of my invention, the forward arm on the operating lever 6 is connected to the cap 2 in front of the pivot 4 by cam means having active and dwell portions, providing for the lost motion between lever 6 and the cap 2, that is the limited relative movement.

As here shown, the cap is provided with a cam slot having an active or inclined portion 9 and an idle or dwell portion 10 and the lever is formed with a follower or pin 11 movable in the slot. As the operating lever 6 extends above the cap 2, this pin is carried by depending arms 12 on the forward arm of the operating lever 6. Also, the cam slot is shown as formed in a diametrically extending rib 13 on the cap extending from the hinged edge toward the free edge thereof.

The means for normally locking the cap closed and constantly tending to move it toward closed position comprises a shoulder on the lever 6 coacting with a shoulder on the cap 2, these shoulders coacting with a camming or wedging action.

14 designates the shoulder on the lever 6, and 15 the shoulder on the cap 2, this shoulder 15 projecting rearwardly beyond the pivot 4. The shoulder 14 is provided near the upper end of the upright portion 8 of the lever so that it swings in an arc and coacts with the shoulder 15 as it approaches the highest portion of its arc.

A spring 16 constantly tends to move the lever in such direction as to close the cap 2.

A suitable gasket 17 is interposed between the upper end of the body or spout 1 and the cap 2.

In operation, lifting up on the free end of the operating lever 6 first moves the pin 11 in the idle portion 10 of the slot and during this movement, the wedge or shoulder 14 clears or moves out from under the shoulder 15. When the pin 11 reaches the upper end of the portion 10 of the slot and enters the cam portion 9, the shoulder 14 has cleared the shoulder 15 and the upward movement of the operating lever 6 swings the cap into full open position. When the operating lever 6 is relieved of the holding force or when the cap is free to close, the spring 16 operates the lever 6 to close the cap. During the closing movement, the pin 11 moves in the cam portion 9 of the slot moving the cap into nearly closed position. When the cam reaches the upper end of the portion 10 of the slot, the shoulder 14 is ready to wedge under the shoulder 15 and as the pin 11 moves downwardly into the portion 10 of the slot, the shoulder 14 wedges upwardly on the shoulder 15 and tightly closes the cap.

Usually the operator actuates the operating lever 6 to open the cap either with one hand which places the nozzle of the hose of a gasoline pump in the inlet point of the tank or actuates the lever 6 by putting the nozzle of the hose under the lever 6, and after thus opening the cap 2, thrusts the nozzle into the spout or body 1. When he withdraws the nozzle from the spout 1, the spring 16 acting on the operating lever 6 then snugly closes the cap, the wedge constantly tends to close the cap and will close it when the obstruction becomes displaced.

What I claim is:

1. The combination of a tubular body and a cap therefor pivoted at one side of the body adjacent the body whereby the cap is hinged at one edge substantially at one edge of the tubular body and movable on its pivot into and out of position to close the body, a pivoted operating member connected to the cap to have a limited movement relatively thereto, the operating member having means for normally locking the cap closed, said means being movable into and out of coaction with the cap during the limited movement of the operating member relatively to the cap and a spring tending to move the operating member to close the cap.

2. The combination of a tubular body and a cap therefor pivoted at one side of the body adjacent the body whereby the cap is hinged at one edge substantially at one edge of the tubular body and movable on its pivot into and out of position to close the body, a pivoted operating member connected to the cap to have a limited movement relatively thereto, the operating member having means for normally locking the cap closed, said means being movable into and out of coaction with the cap during the movement of the operating member relatively to the cap, said means coacting with the cap with a wedging action, and a spring tending to move the operating member to close the cap.

3. The combination of a tubular body and a cap therefore pivoted at one side of the body adjacent the body whereby the cap is hinged at one edge substantially at one edge of the tubular body and movable on its pivot into and out of position to close the body, a pivoted operating member connected to the cap to have a limited movement relatively thereto the operating member having means for normally locking the cap closed, said means being movable into and out of coaction with the cap during the movement of the operating member relatively to the cap and a spring tending to move the operating member to close the cap, the operating member extending toward the free edge of the cap, and said means coacting with the cap with a wedging action.

4. The combination of a tubular body and a cap therefor pivoted at one side of the body adjacent the body whereby the cap is hinged at one edge substantially at one edge of the tubular body and movable on its pivot into and out of position to close the body, a pivoted operating member connected to the cap to have a limited movement relatively thereto, the operating member having means for normally locking the cap closed, said means being movable into and out of coaction with the cap during the movement of the operating member relatively to the cap and a spring tending to move the operating member to close the cap, the operating member extending toward the free edge of the cap, and said means coacting with the cap with a wedging action in the rear of the pivot of the cap.

5. The combination of a tubular body and a cap therefor pivoted at one side of the body adjacent the body whereby the cap is hinged at one edge substantially at one edge of the tubular body and movable on its pivot into and out of position to close the body, a pivoted operating member, and a spring tending to move the operating member to close the cap, the operating member extending toward the free edge of the cap and connected to the cap in front of the pivot of the cap by a pin-and-slot connection, the slot having a cam portion and an idle portion, the latter constituting a lost motion connection movement between the operating member and the cap permitting the limited relative movement, and the locking means being arranged to move into and out of coaction with the cap while the pin is moving in the idle portion of the slot during the closing and opening of the cap.

6. The combination of a tubular body and a cap therefor pivoted at one side of the body adjacent the body whereby the cap is hinged at one edge substantially at one edge of the tubular body and movable on its pivot into and out of position to close the body, a pivoted operating member connected to the cap to have a limited movement relatively thereto, the operating member having means for normally locking the cap closed, said means being movable into and out of coaction with the cap during the movement of the operating member relatively to the cap, and a spring tending to move the operating member to close the cap, and the operating member being pivoted to the body below the pivot of the cap, and said member extending toward the free edge of the cap and connected to the cap in front of the pivot of the cap by a pin-and-slot connection, the slot having a cam portion and an idle portion, the latter constituting a lost motion connection movement between the operating member and the cap permitting the limited relative movement, and the locking means being arranged to move into and out of coaction with the cap while the pin is moving in the idle portion of the slot during the closing and opening of the cap, said locking means coacting with the cap in the rear of the pivot of the cap.

7. The combination of a tubular body and a cap therefor pivoted at one side of the body adjacent the body whereby the cap is hinged at one edge substantially at one edge of the tubular body and movable on its pivot into and out of position to close the body, a pivoted operating member extending toward the free edge of the cap, the operating member having means connected to the cap by a lost motion connection to open the cap, the cap also having a cam coacting with said means, the operating member also having means for finally closing the cap, the last mentioned means movable into and out of engagement with the cap during the lost motion movement of the operating member, and a spring tending to move the operating member to close the cap.

8. The combination of a tubular body and a cap therefor pivoted at one side of the body adjacent the body whereby the cap is hinged at one edge substantially at one edge of the tubular body and having a shoulder projecting rearwardly beyond its pivot, the cap being movable on its pivot into and out of position to close the body, a pivoted operating member, the pivot of said member being located below the pivot of the cap and extending upwardly in the rear of said shoulder and forwardly toward the free edge of the cap, the operating member having a shoulder thereon arranged to engage under the shoulder of the cap when the former shoulder is in the highest part of its arc of movement, and means connecting the forward portion of the operating member and the cap to transfer the movement of the operating member to the cap with a lost motion permitting the shoulder on the operating member to clear the shoulder on the cap during the final closing movement, and a spring tending to move the operating member and the cap toward closed position.

9. The combination of a tubular body and a cap therefor pivoted at one side of the body adjacent the body whereby the cap is hinged at one edge substantially at one edge of the tubular body and having a shoulder projecting rearwardly beyond its pivot, the cap being movable on its pivot into and out of position to close the body, a pivoted operating member, the pivot of said member being located below the pivot of the cap and extending upwardly in the rear of said shoulder and forwardly toward the free edge of the cap, the operating member having a shoulder thereon arranged to engage under the shoulder of the cap when the former shoulder is in the highest part of its arc of movement, means connecting the forward portion of the operating member and the cap including a cam having an active and an idle portion and a follower coacting with the cam, the follower normally engaging the idle portion when the cap is closed and during the final closing movement of the cap, and a spring tending to move the operating member toward its normal position occupied when the cap is closed.

10. The combination of a tubular body and a cap therefor pivoted at one side of the body adjacent the body whereby the cap is hinged at one edge substantially at one edge of the tubular body and movable on its pivot into and out of position to close the body, and a pivoted operating member connected to the cap to have a limited movement relatively thereto, the operating member having means for normally locking the cap closed, said means being movable into and out of coaction with the cap during the limited movement of the operating member relatively to the cap.

11. The combination of a tubular body and a cap therefor pivoted at one side of the body adjacent the body whereby the cap is hinged at one edge substantially at one edge of the tubular body and movable on its pivot into and out of position to close the body, and a pivoted operating member connected to the cap to have a limited movement relatively thereto, the operating member having means for normally locking the cap closed, said means being movable into and out of coaction with the cap during the movement of the operating member relatively to the cap, said means coacting with the cap with a wedging action.

12. The combination of a tubular body and a cap therefor pivoted at one side of the body adjacent the body whereby the cap is hinged at one edge substantially at one edge of the tubular body and movable on its pivot into and out of position to close the body and a pivoted operating member connected to the cap to have a limited movement relatively thereto, the operating member having means for normally locking the cap closed, said means being movable into and out of coaction with the cap during the movement of the operating member relatively to the cap, the operating member extending toward the free edge of the cap, and said means coacting with the cap with a wedging action.

13. The combination of a tubular body and a cap therefor pivoted at one side of the body adjacent the body whereby the cap is hinged at one edge substantially at one edge of the tubular body and movable on its pivot into and out of position to close the body, and a pivoted operating member extending toward the free edge of the cap, the operating member having means connected to the cap by a lost motion connection to open the cap, the cap also having a cam coacting with said means, the operating member also having means for finally closing the cap, the last mentioned means movable into and out of engagement with the cap during the lost motion movement of the operating member 14. The combination of a tubular body and a cap therefor pivoted at one side of the body adjacent the body whereby the cap is hinged at one edge substantially at one edge of the tubular body and having a shoulder projecting rearwardly beyond its pivot, the cap being movable on its pivot into and out of position to close the body, a pivoted operating member, the pivot of said member being located below the pivot of the cap and extending upwardly in the rear of said shoulder and forwardly toward the free edge of the cap, the operating member having a shoulder thereon arranged to engage under the shoulder of the cap when the former shoulder is in the highest part of its arc of movement, and means connecting the forward portion of the operating member and the cap including a cam having an active and an idle portion and a follower coacting with the cam, the follower normally engaging the idle portion when the cap is closed and during the final closing movement of the cap.

In testimony whereof, I have hereunto signed my name, at Syracuse, in the county of Onondaga, and State of New York, this 23rd day of April, 1930.

MAX F. HARRIS.